(12) United States Patent
Nakaminami et al.

(10) Patent No.: US 6,473,951 B1
(45) Date of Patent: Nov. 5, 2002

(54) SPINDLE DEVICE FOR MACHINE TOOLS

(75) Inventors: Masamitsu Nakaminami, Yamatokoriyama (JP); Kazuhiko Matsumoto, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/571,381

(22) Filed: May 15, 2000

(30) Foreign Application Priority Data

May 13, 1999 (JP) .......................... 11-132407

(51) Int. Cl.$^7$ .............................. B23B 3/22; B23Q 3/12
(52) U.S. Cl. ........................ 29/27 R; 29/27 C; 29/40; 82/158; 409/201; 409/211; 409/231; 409/233
(58) Field of Search .................................. 409/233, 232, 409/231, 136, 211, 201, 216, 135; 29/40, 39, 27 C, 27 R; 82/159, 161, 158

(56) References Cited

U.S. PATENT DOCUMENTS

| | | | | |
|---|---|---|---|---|
| 4,790,699 A | * | 12/1988 | Ringel | 409/231 |
| 5,156,504 A | * | 10/1992 | Stich et al. | 409/136 |
| 5,295,937 A | * | 3/1994 | Katoh et al. | 483/28 |
| 5,816,105 A | * | 10/1998 | Adelstein | 901/46 X |
| 6,309,150 B1 | | 10/2001 | Hangleiter | |

FOREIGN PATENT DOCUMENTS

| | | | | |
|---|---|---|---|---|
| DE | 229 21 999 U | | 2/2000 | |
| EP | 887 134 A | | 12/1998 | |
| JP | 0199308 | * | 9/1987 | 409/233 |
| JP | 363002638 | * | 1/1988 | 409/233 |
| JP | 63-109905 | * | 5/1988 | 29/40 |

* cited by examiner

Primary Examiner—William Briggs
(74) Attorney, Agent, or Firm—Smith Patent Office

(57) ABSTRACT

A spindle device for machine tools that can eliminate the need for laborious air bleeding work and labor-demanding fitting/removing work for maintenance. The spindle device for machine tools includes a drawbar that is axially movably inserted into an axial hole of a tool spindle body. The drawbar serves to bias a tool in a clamping direction. An unclamping cylinder mechanism is provided in a rear of the tool spindle and serves to move the drawbar in an unclamping direction. The unclamping cylinder mechanism has a cylinder block fixed to a rear end wall of the tool spindle body and includes a plurality of bolts. A relay oil passage allows a hydraulic passage in the tool spindle body and a hydraulic passage in the cylinder block to communicate with each other.

15 Claims, 6 Drawing Sheets

SPINDLE DEVICE FOR MACHINE TOOLS

BACKGROUND OF THE INVENTION

1. Field of the Invention

The present invention relates to a spindle device for machine tools that is equipped with an unclamping cylinder mechanism for moving a drawbar in an unclamping direction. The drawbar biases a tool fit into the tool spindle.

2. Discussion of the Related Art

An unclamping cylinder mechanism has been used in a spindle device for unclamping a tool fit into a tool spindle. Conventionally the unclamping cylinder mechanism has been provided with a cylinder block having a hydraulically driven piston that is tightened to a rear end wall of a tool headstock and it serves to pivotally support the tool spindle. This is done by means of a plurality of bolts with a gap provided against the tool spindle. Further a hydraulic passage in the tool spindle body and a hydraulic passage in the cylinder block are connected to each other by means of hydraulic piping.

In such a spindle device, generally, the whole unclamping cylinder mechanism is removed from the tool spindle body for maintenance or replacement of the tool spindle. In this state, the tool spindle is pulled out forward, due to interference with other working tools and the structure of the component parts.

However, in such a conventional structure, when the whole unclamping cylinder mechanism is removed, bleeding air from the hydraulic piping is necessary to refit the unclamping cylinder mechanism to the tool spindle body. This requires labor and time to perform this task and it represents a problem. Also, since the conventional structure involves removing and refitting the unclamping cylinder mechanism which is heavy, the operator is burdened with a laborious task and this results in a lower work efficiency that is considered another problem.

SUMMARY OF THE INVENTION

The present invention has been made considering the above mentioned problems in the prior art. An object of the present invention is to provide a spindle device for machine tools that can eliminate the need for the laborious air bleeding work and the labor-demanding removing/refitting work.

In order to achieve the above object, the present invention provides a spindle device for a machine tool, comprising a tool spindle body having an axial hole therein; a drawbar movably disposed in the axial hole of the tool spindle body for biasing a tool in a clamping direction; and an unclamping cylinder mechanism provided at a rear portion of the tool spindle body for moving the drawbar in an unclamping direction. The unclamping cylinder mechanism includes a cylinder block having a hydraulic passage therein. The cylinder block is connectable to a rear end wall of the tool spindle body with a plurality of bolts. Further, a relay oil passage is partially disposed in one of the plurality of bolts for allowing hydraulic fluid to communicate with the hydraulic passage in the cylinder block. The unclamping cylinder mechanism is supportable by one of the plurality of bolts so as to be pivotable between a locked position and a released position. The unclamping cylinder mechanism can be pivotable on a locking bolt.

To remove the tool spindle of the invention, bolts other than the locking bolt having the relay oil passage therein are loosened and removed, and then the whole unclamping cylinder mechanism is pivoted about the locking bolt to the retreat or released position. As a result, while the unclamping cylinder mechanism remains supported on the tool spindle by the locking bolt, a rear end portion of the tool spindle is exposed. In this state, the tool spindle is pulled out forward. On the other hand, for refitting of the unclamping cylinder mechanism, the whole unclamping cylinder mechanism is pivoted to the original locked position about the locking bolt and then the removed bolts are tightened and locked.

According to the spindle device of the invention, the relay oil passage, for making the hydraulic passage in the cylinder block and the hydraulic passage in the tool spindle body communicate with each other, is formed in one locking bolt out of the plurality of bolts. The unclamping cylinder mechanism is supported by the locking bolt so as to be pivotable between the locked position and the released position. Therefore, the removal work of the tool spindle can be achieved while both the hydraulic passages of the tool spindle body and the cylinder block are kept in communication with each other and while the whole unclamping cylinder mechanism is supported on the tool spindle body. As a result, the need for bleeding air during refitting the unclamping cylinder mechanism can be eliminated. Further the labor demanded of the operator can be reduced compared to when the whole unclamping cylinder mechanism is removed outwardly and refitted as in the conventional case described above. Thus, the present invention can improve the working efficiency for maintenance and replacement of the tool spindle.

Also, since the hydraulic passage in the tool headstock and the hydraulic passage in the cylinder block communicate with each other via the relay oil passage of the locking bolt, the need for conventional hydraulic piping can be eliminated. This allows a reduction in the number of parts as well as a simplification in the structural arrangement as further advantages of this invention.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Figure 1:
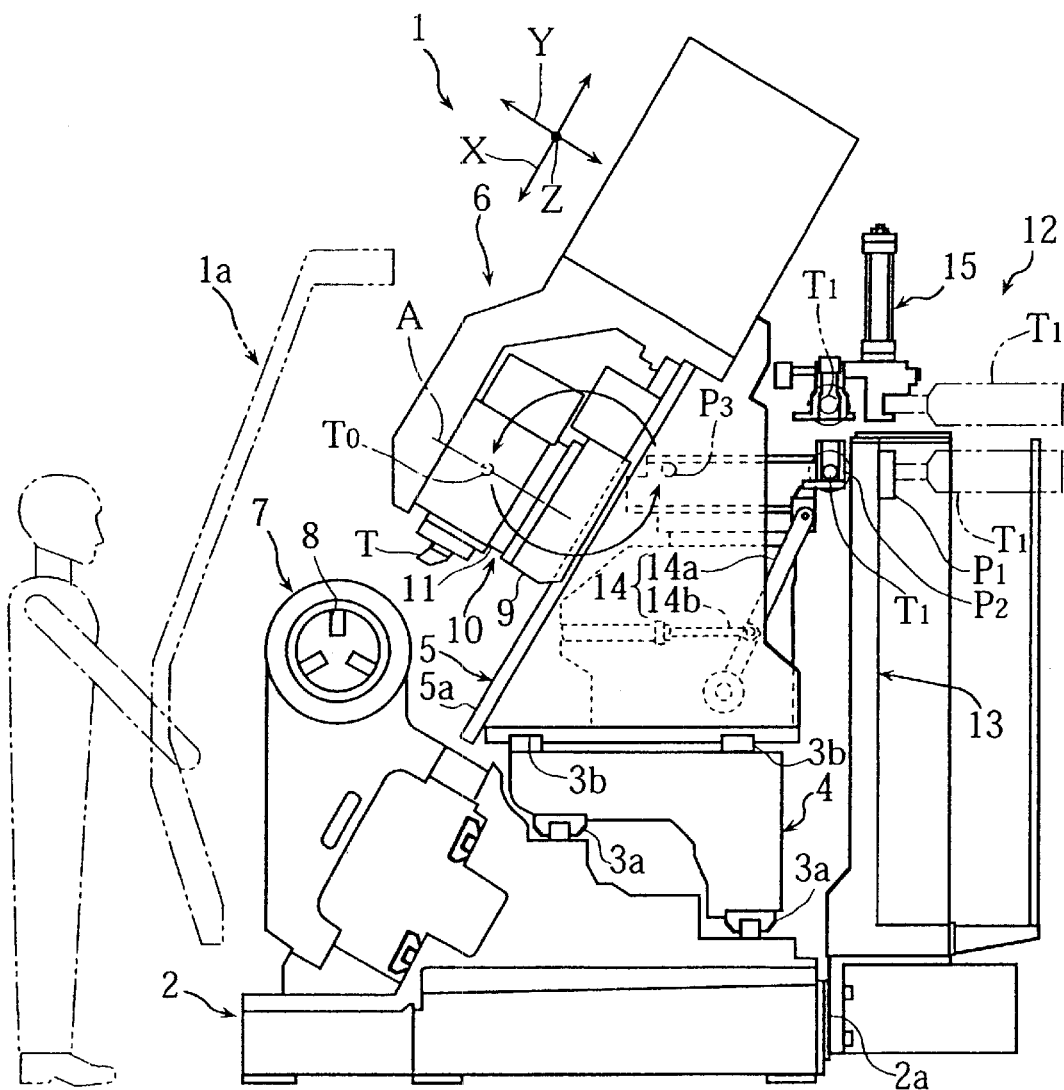
FIG. 1 is a side view of a combined-machining lathe according to an embodiment of the invention.

Referring to the figures, a combined-machining lathe 1 (machine tool) is disclosed that is capable of performing both lathe turning and rotating-tool machining. The combined-machining lathe 1, is disposed on top of a fixed bed 2, and includes a headstock 7 fixedly located on a left-side end portion as viewed in FIG. 1. A saddle 4 is located to the right side of the headstock 7 so as to be movable along a Z-axis direction (a direction perpendicular to the drawing sheet) parallel to the longitudinal axis of the headstock 7 by two linear-guide rails 3a. On top of the saddle 4, a column 5 is placed that is movable within a horizontal plane and along a direction parallel to the longitudinal axis of the headstock 7 by two linear guide rails 3b. Moreover, a tool post (spindle device) 6 with a tool T inserted thereto is placed on the column 5 along a sloping surface 5a of the column 5 so that it is movable along an X-axis direction perpendicular to the longitudinal axis of the headstock 7.

A main spindle equipped with a chuck 8 for gripping a workpiece is provided on the headstock 7 that is fixed on the fixed bed 2. This main spindle is rotationally driven by a spindle motor (not shown). In addition, a door 1a is provided for opening and closing an access opening formed in a cover (not shown).

Regarding the general structure of the tool post 6, a support base 9 is disposed on the forwardly-declined sloping surface 5a (having a slope angle of 60 degrees) of the column 5 so that it is slidable along the X-axis direction. A tool post body (tool headstock) 11 is supported on the support base 9 so that it is rotationally indexable and clampable about a pivoting axis A by means of a rotational indexing device 10.

Figure 2:
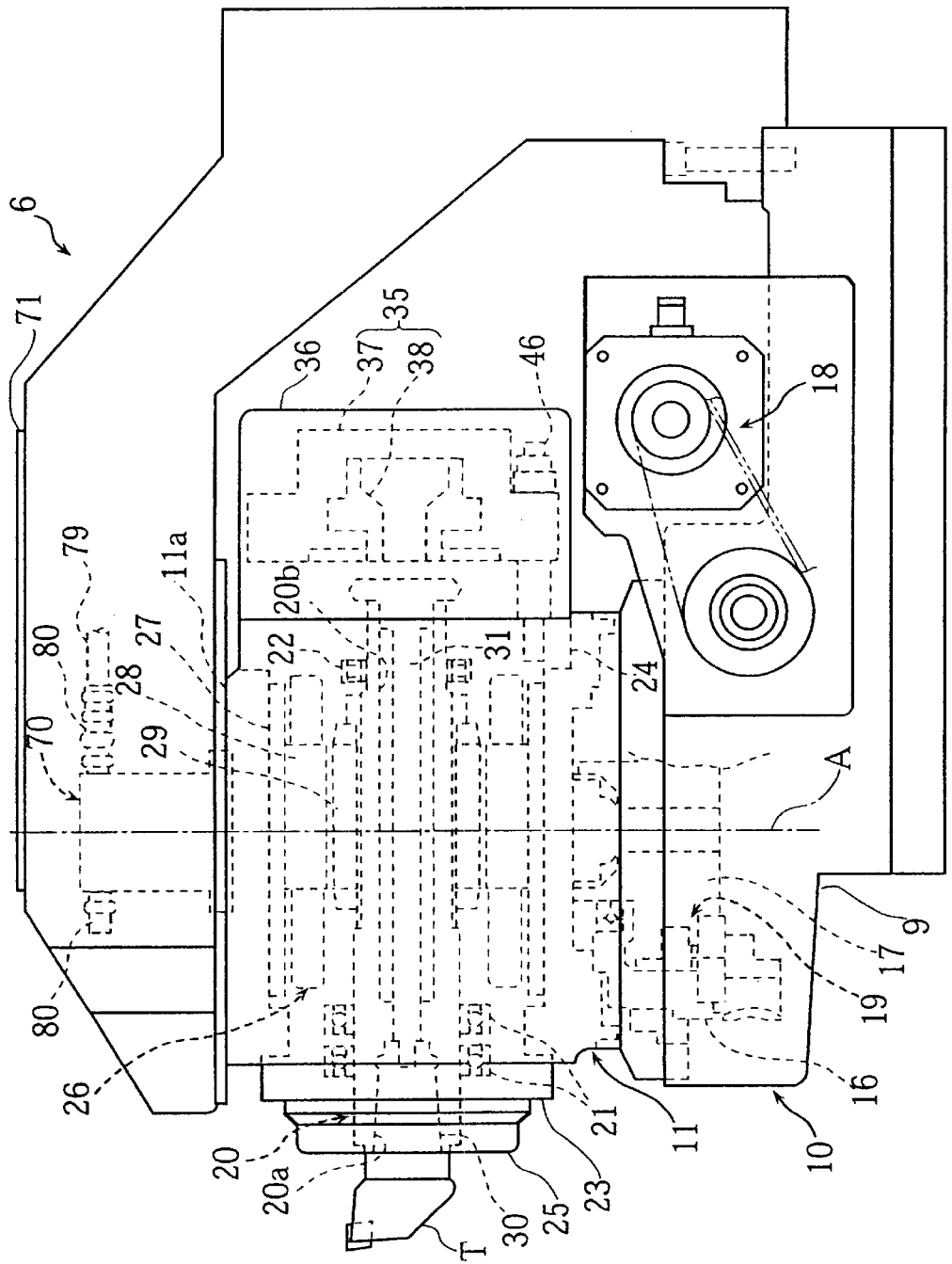
FIG. 2 is a side view of the tool post according to the embodiment of the invention.

The rotational indexing device 10 shown in FIG. 2 includes: a rotating table 16 fixedly bolted to the tool post body 11; a fixed table 17 placed within the rotating table 16 coaxially therewith and fixedly bolted to the support base 9; a rotation driving mechanism 18 for rotationally driving the rotating table 16 to a specified indexing angle position; and a coupling mechanism 19 for fixing the rotating table 16 to an indexing angle position of the fixed table 17.

An automatic tool exchanger 12 shown in FIG. 1 is mounted on a rear end wall 2a of the fixed bed 2. This automatic tool exchanger 12 is equipped with a multiplicity of tools (60 to 180). The tool exchanger 12 comprises: a tool magazine 13 for transferring, indexing and positioning a next-process tool T1 to a reception position P1; a transferring and pivoting mechanism 15 for transferring and pivoting the next-process tool T1, that has been indexed to the reception position P1, to a delivery position P2; a tool transfer mechanism 14 having a transfer arm 14a and a driving cylinder 14b and serves to transfer the next-process tool T1, which has been transferred to the delivery position P2, to a tool exchanging position P3; and a tool exchanging mechanism for exchanging a process-completed tool T0 fitted to the tool post 6 with the next-process tool T1, that has been transferred to the tool exchanging position P3, by turning the tools 180 degrees (see arrows in FIG. 1) and using an exchanging arm and exchanging shaft (both not shown). In addition, to exchange the tools, the process-completed tool T0 is positioned in the exchanging position by turning the tool post body 11 about the pivoting axis A along a direction vertical to the drawing sheet of FIG. 1 with the rotational indexing device 10.

The tool post body 11 is generally cylindrically shaped. A front flange 23 and a rear flange 24 are fixedly bolted to a front end face and a rear end face of the tool post body 11, respectively. Further a lid member 25 is fixedly bolted to the front end face of the front flange 23. A tool spindle 20 is inserted into the tool post body 11 coaxially therewith. The tool spindle 20 is rotatably supported on the front and rear flanges 23, 24 at its front end portion by a pair of ball bearings 21, and at its rear end portion by a roller bearing 22.

A spindle motor 26 is incorporated into the tool post body 11. In this spindle motor 26, a stator 28 is inserted and fixed to the inner circumferential surface of the tool post body 11 via a sleeve 27, and a rotor 29 is fixed to the outer circumferential surface of the tool spindle 20 so as to be opposed to the stator 28. Also, a coolant flow passage 27a is formed in the sleeve 27, and a coolant is supplied to the coolant flow passage 27a by a cooling system (not shown) so that the stator 28 is cooled from the outer periphery.

The tool spindle 20 is provided with a coupling mechanism (not shown) which fixes the tool spindle 20 to the tool post body 11 for a turning tool process and which unfixes and thereby permits the tool spindle 20 to rotate for a rotating-tool process.

A tool-fitting taper hole 20a is formed at a front end portion of the tool spindle 20 and a holder 30 of the tool T is removably taper-fit to the taper hole 20a. Further, an axial hole 20b for leading the taper hole 20a to the rear end face of the spindle is formed at an axial center of the tool spindle 20. A drawbar 31 is inserted in this axial hole 20b so as to be axially movable therein. Between this drawbar 31 and the tool spindle 20 are mounted a multiplicity of belleville springs 32 for biasing the drawbar 31 in a clamping direction (toward the rear direction). The drawbar 31 is biased rearwardly by the belleville springs 32 so that the tool T is clamped to the tool spindle 20.

Figure 3:
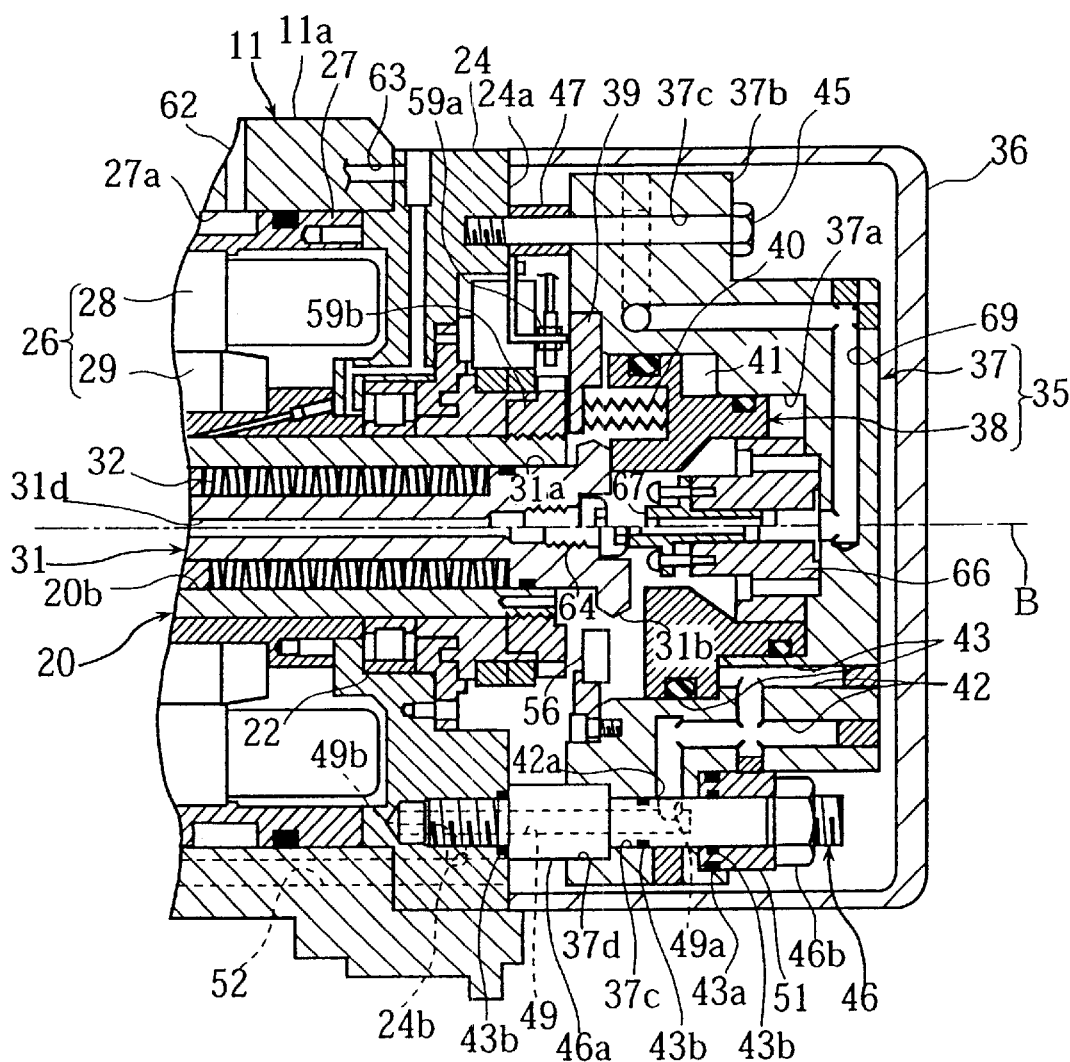
FIG. 3 is a cross sectional side view of the unclamping cylinder mechanism in the tool post.
Figure 4:
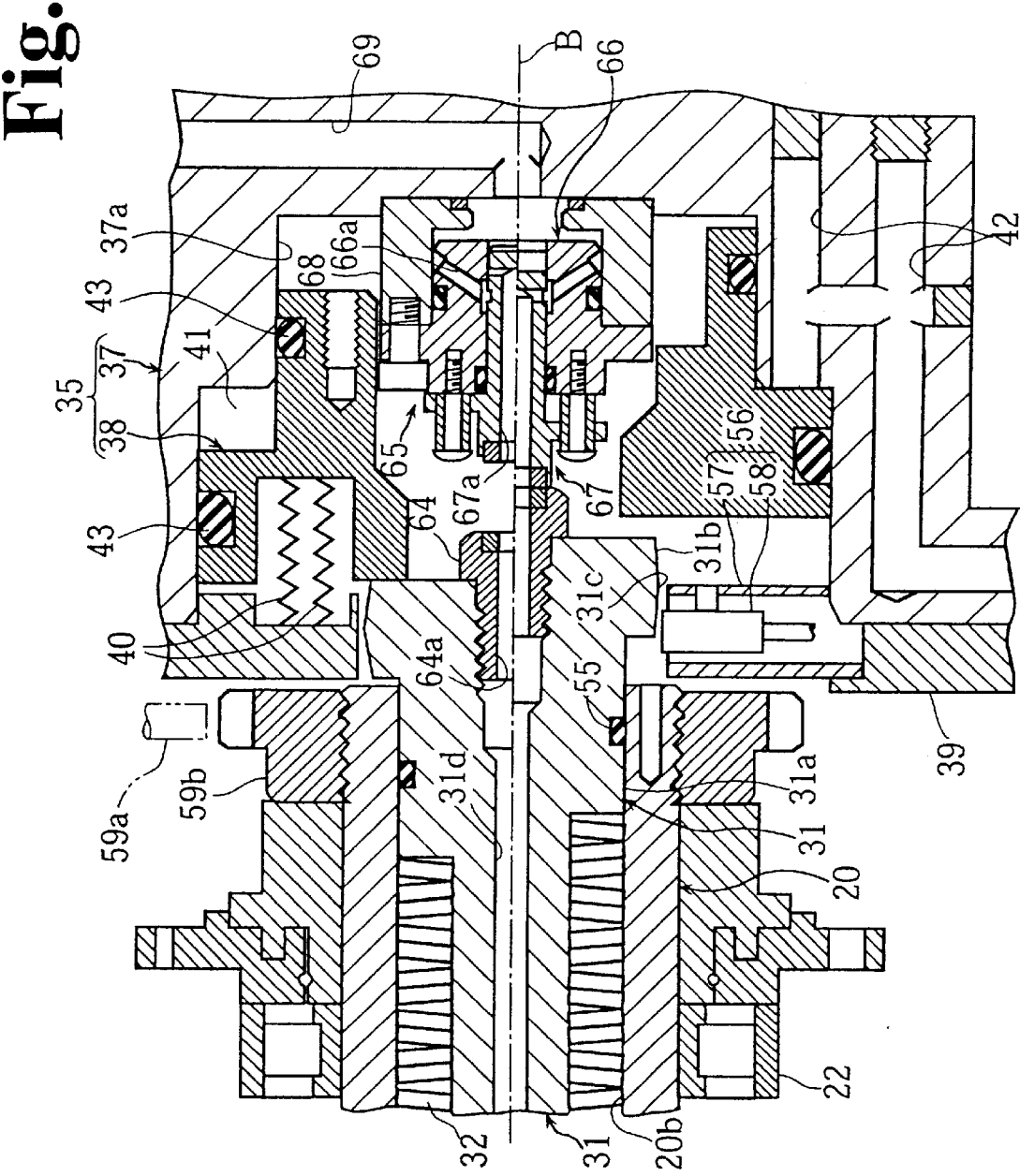
FIG. 4 is a cross sectional side view of the clamping/unclamping detection mechanism in the tool post.

An unclamping cylinder mechanism 35 is disposed in the rear of the tool post body 11. This unclamping cylinder mechanism 35 is covered with a cylinder cover 36 removably fit to the rear end wall 24a of the rear flange 24. In FIGS. 3 and 4, the upper part of the unclamping cylinder mechanism 35 shown above axis B shows an unclamped state and the lower part shown below axis B shows a clamped state.

The unclamping cylinder mechanism 35 has a structure that generally includes a ring-shaped piston 38 that is axially advanceable and retreatable in a recessed cylinder portion 37a of the cylinder block 37. The cylinder block 37 is formed generally into a bowl shape having a diameter slightly smaller than the rear flange 24. A stopper plate 39 is fixed to a front-end opening edge of the cylinder recessed portion 37a. Between the piston 38 and the stopper plate 39, a spring 40 for biasing the piston 38 in the release direction is provided. In addition, reference numeral 43 denotes a seal member for preventing oil pressure from leaking from an oil chamber 41 defined by the cylinder block 37 and the piston 38.

A hydraulic passage 42 for supplying oil pressure to the oil chamber 41 is formed in the cylinder block 37. When working oil is supplied to this oil chamber 41 at a specified oil pressure, the piston 38 is advanced to move the drawbar 31 in the unclamping direction (axially forward), thereby the tool T is unclamped. When the hydraulic passage 42 is opened, the piston 38 retreats due to the spring 40 and the working oil within the oil chamber 41 is discharged. Thus the drawbar 31 is moved in the clamping direction by the belleville springs 32.

A stepped flange portion 37b is formed on the outer periphery of the cylinder block 37 and eight bolt holes 37c are bored in the flange portion 37b. Normal bolts 45 are inserted into seven bolt holes other than the leftmost one, as viewed from the axial rear end. A special locking bolt 46 having a relay oil passage 49 formed therein is inserted into the one leftmost bolt hole 37c, so that the cylinder block 37 is fixedly tightened to the rear flange 24 by the bolts 45, 46. In this case, collars 47 are fit to the seven bolts 45, respectively, and the collars 47 are positioned between the rear flange 24 and the cylinder block 37, thus defining a specified gap between the two members 24, 37.

The one locking bolt 46 is screwed into the rear flange 24. A front end face of a step portion 46a formed integrally with the locking bolt 46 abuts on the rear end wall 24a of the rear flange 24. A rear half of the step portion 46a is inserted into a recessed portion 37d of the cylinder block 37. A nut 46b is screwed to the head side of the locking bolt 46 with a shock absorbing member 51 provided thereon. Tightening this nut 46b allows the cylinder block 37 to be fixed to the rear flange 24. In addition, reference numerals 43a, 43b denote seal members for preventing oil pressure from leaking from the relay oil passage 49.

When the cylinder cover 36 is removed, the nut 46b can be loosened a little and the seven bolts 45 can be removed. Then the cylinder block 37 becomes pivotable from the locked position to a retreat or released position which is lower and outside the axial projection of the tool spindle 20 resulting from projecting the tool spindle 20 in the axial direction. As a result of this, a space for removing component parts related to the tool spindle can be ensured.

The relay oil passage 49 is formed so that it extends along the axis of the locking bolt 46 and both end portions of the relay oil passage 49 are bent perpendicularly to the axis so that they are opened to the outside by its rear and front-side openings 49a, 49b. The rear-side opening 49a of the relay oil passage 49 communicates with a downstream opening 42a of the hydraulic passage 42 communicating with the oil chamber 41. Also, the front-side opening 49b communicates with a hydraulic passage 24b formed in the rear flange 24. The hydraulic passage 24b communicates with a primary hydraulic passage 52 formed in the tool post body 11. An oil pressure supply source (not shown) is connected to an upstream end of this primary hydraulic passage 52 so as to communicate therewith. As a result of this, working oil is supplied from the primary hydraulic passage 52 and the hydraulic passage 24b, through the relay oil passage 49 of the locking bolt 46 to the hydraulic passage 42 and the oil chamber 41.

Next, a clamping/unclamping detection mechanism of the tool post (spindle device) 6 is explained.

FIG. 4 shows a boss portion 31a which is in sliding contact with the inner circumferential surface of the axial hole 20b of the tool spindle 20 and is formed at a rear end portion of the drawbar 31. A seal member 55 is provided between the boss portion 31a and the tool spindle 20. A detection-target portion 31b is formed rearwardly and protrudes at a rear end of the boss portion 31a. A rear end portion of this detection-target portion 31b is disposed so that it is opposed to a front end face of the piston 38 located within the cylinder recessed portion 37a of the cylinder block 37 whereby the rear end portion can contact the front end face of the piston 38.

The detection-target portion 31b is formed so it is larger in diameter than the boss portion 31a. The detection-target portion 31b has its largest diameter at its axially central portion 31c and is tapered therefrom in the axial direction. Accordingly, the axially central portion 31c of the outer circumferential surface of the detection-target portion 31b is the most radially outward point.

One displacement sensor 56 is located so that it is opposed to the detection-target portion 31b with a specified spacing therebetween. In this displacement sensor 56, a detecting element 58 is inserted in a cylindrical casing 57 and this casing 57 is disposed perpendicularly to the axis B of the drawbar 31 and fixed to the stopper plate 39.

Figure 6:
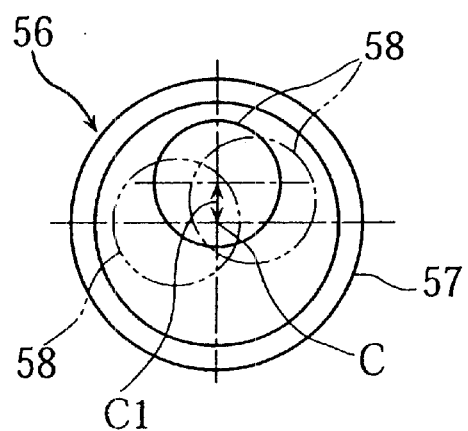
FIG. 6 is a schematic view of a displacement sensor in the clamping/unclamping detection mechanism.

As shown in FIG. 6, the detecting element 58 is fixedly set within the casing 57 at a position displaced by distance C1 from an axis C of the casing 57, while the casing 57 is mounted to the stopper plate 39 so that its mounting rotational angle is variable about the axis C. By changing the mounting rotational angle of the casing 57 to the stopper plate 39, the position of the detecting element 58 in the direction of the axis B relative to the detection-target portion 31b is adjustable. In this way, the detection center of the detecting element 58 can be adjusted so as to be coincident with the central portion 31c of the detection-target portion 31b located in the unclamping position.

Figure 7:
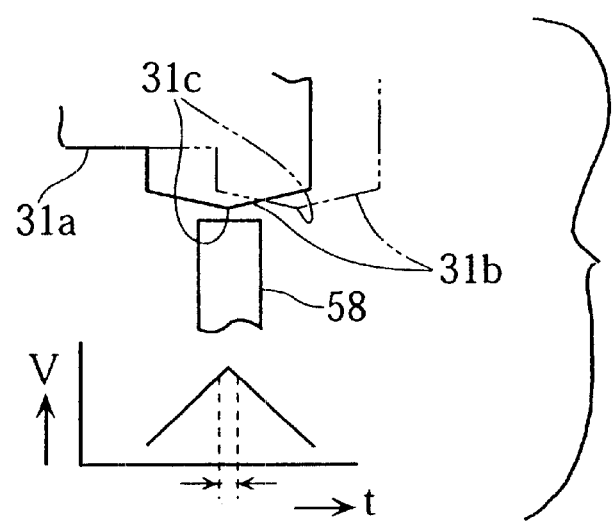
FIG. 7 is a combined view showing the detection target and the displacement sensor along with the detected characteristics view of the displacement sensor.

As shown in FIG. 7, the detecting element 58 outputs a voltage value responsive to a change in its distance from the detection-target portion 31b. When the central portion 31c is coincident with the detecting element 58, the voltage output becomes a voltage value between upper and lower threshold values (shown by dashed lines in FIG. 7), allowing the unclamping position to be detected. In addition, reference numeral 59a denotes a rotational speed sensor of the tool spindle 20. The sensor 59a is disposed so that it is opposed to a rotor formed on the outer periphery of a lock nut 59b fitted to the rear end portion of the tool spindle 20 (see FIGS. 3 and 4). Further, when the voltage output is other than a value between the upper and lower threshold values, then it is decided that the tool has been clamped.

Next, a coolant unit of the tool post (spindle device) 6 is explained.

This coolant unit 60 supplies a coolant from a coolant tank (not shown) to the machining part in the tool T by pressurizing the coolant with a pump.

As shown in FIG. 4, a coolant hole 31d for supplying the coolant to the tool T is formed in the axial center of the drawbar 31 and a cap 64 having an axial hole 64a communicating with the coolant hole 31d is fitted to a rear end portion of the coolant hole 31d.

A valve mechanism 65 is fixedly set in the bottom wall of the cylinder recessed portion 37a of the cylinder block 37. This valve mechanism 65 has a structure including a cylinder 66 that is fixed to the cylinder recessed portion 37a via a support member 68. The valve mechanism 65 includes a valve piston 67 for opening and closing a cylinder hole 66a formed in the cylinder 66. The valve piston 67 is inserted axially in the cylinder 66 and is removable therefrom. A coolant passage 67a communicates with the cylinder hole 66a and is formed at the axial center of the valve piston 67. A coolant supply passage 69 formed in the cylinder block 37 communicates with the cylinder hole 66a and an upstream end of the supply passage 69 is communicated with and connected to the coolant tank via piping.

In this valve mechanism 65, when the drawbar 31 is moved backward to the clamping position and the cap 64 is located at the retreat end, the opening/closing valve of the coolant supply passage 69 is opened and the valve piston 67 advances. In this position, the coolant passage 67a and the cylinder hole 66a are communicated with each other and the coolant passage 67a and the axial hole 64a are connected to each other. In addition, when the drawbar 31 is moved forward to the unclamping position, the opening/closing valve is closed.

Figure 5:
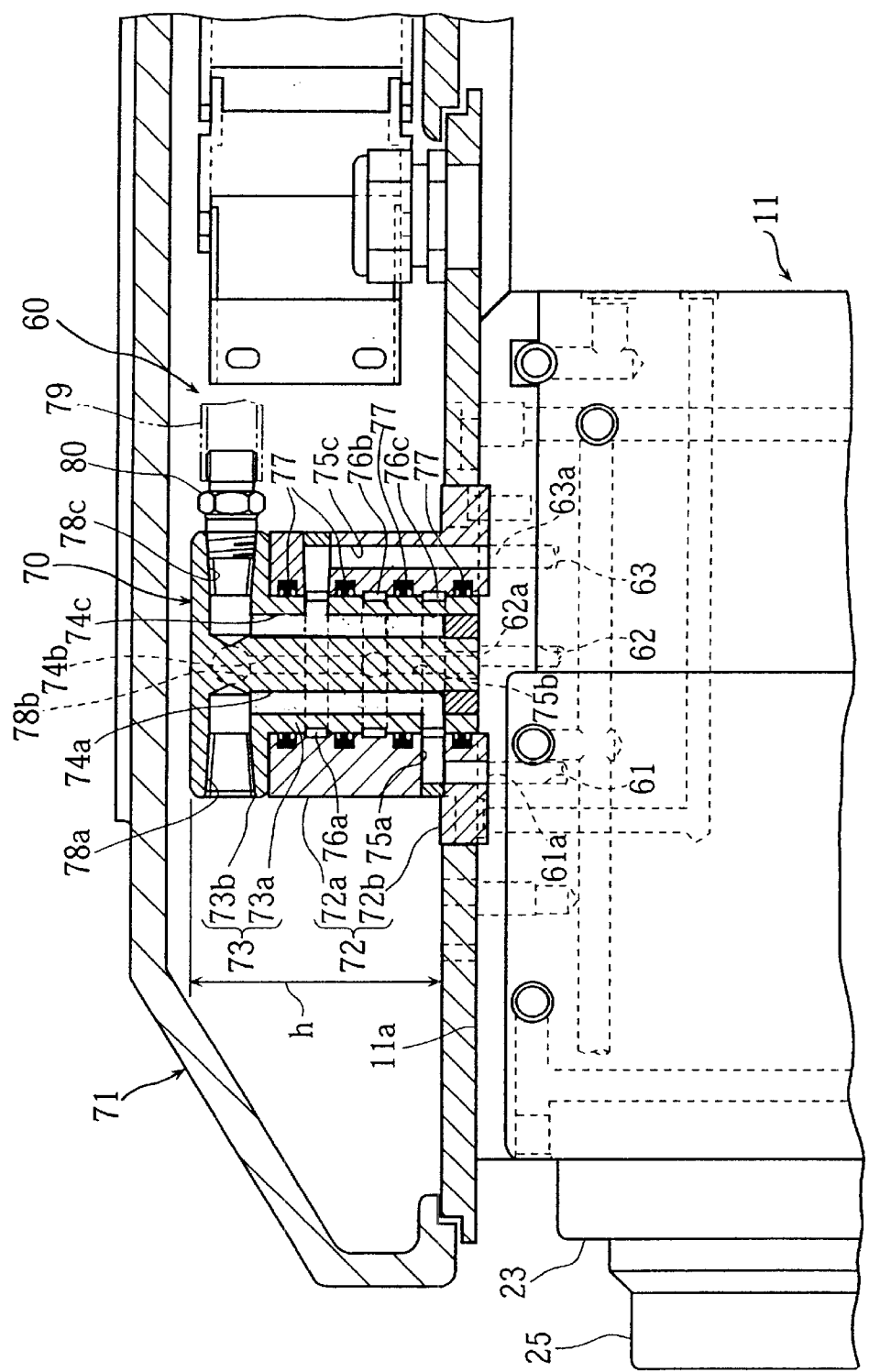
FIG. 5 is a cross sectional side view of the rotary union used in the tool post.

Coolant passages 61, 62, 63 are formed in the tool post body 11, and upstream end openings 61a, 62a, 63a of the coolant passages 61, 62, 63, respectively, are led to an upper wall 11a of the tool post body 11 (see FIGS. 3 and 5).

A rotary union 70 is provided on the upper wall 11a of the tool post body 11 and the rotary union 70 is accommodated in a box-shaped cover member 71 provided on the upper wall 11a. This rotary union 70 is so structured that a columnar-shaped second union member 73 is inserted into a cylindrical-shaped first union member 72 so as to be rotatable relative thereto. The rotary union 70 is so arranged that its axis is in a straight line with the pivoting axis A of the tool post body 11 (see FIG. 2).

The first union member 72 is so structured that a flange portion 72b is integrally formed at a lower edge of a cylinder body 72a. The flange portion 72b is fixedly bolted to the upper wall 11a. Also, the second union member 73 is so structured that a head portion 73b, generally equal in diameter to the first union member 72, is integrally formed in an upper end of an axis portion 73a inserted into the first union member 72.

Three flow passages 74a, 74b, 74c extending axially are formed in the axis portion 73a of the second union member 73. Further, flow passages 75a, 75b, 75c communicating with the flow passages 74a, 74b, 74c, respectively, are formed in the cylinder body 72a of the first union member 72. Outlets of these flow passages 75a–75c are communicated with and connected to the upstream end openings 61a, 62a, 63a of the coolant passages 61–63, respectively.

The pairs of flow passages 74a and 75a, flow passages 74b and 75b, flow passages 74c and 75c are communicated with each other via circumferentially extending annular peripheral recesses 76c, 76b, 76a, respectively, formed in the sliding surface between the cylinder body 72a and the axis portion 73a. As a result of this arrangement, those flow passages keep communicating with each other even during rotational indexing operations of the tool post body 11. Further, seal members 77 are provided on both sides of the peripheral recesses 76a, 76b, 76c, respectively.

Inlets 78a, 78b, 78c communicating with the flow passage 74a, 74b, 74c, respectively, are formed at the head portion 73b of the second union member 73. These inlets 78a–78c are formed with specified circumferential angular spacings so as to be directed in a direction perpendicular to the longitudinal axis of the axis portion 73a. Coolant hoses 79 are connected to the inlets 78a–78c via joints 80, respectively, and an upstream end portion of each coolant hose 79 is connected to the coolant tank via an opening/closing valve and pump (both not shown).

Next, functional effects of this embodiment are described.

In the tool post (spindle device) 6 of this embodiment, when the tool spindle 20 is removed due to maintenance or the like, the tool T is removed from the front end portion of the tool spindle 20. Thereafter, with the cylinder cover 36 removed, the piping connected to the coolant supply passage 69 is undone, the seven bolts 45 are loosened and removed, and further the nut 46b of the one remaining locking bolt 46 is loosened a little. In this state, the cylinder block 37 is pivoted to the released position about the locking bolt 46. As a result, while the whole unclamping cylinder mechanism 35 remains supported by the locking bolt 46, the rear end face of the tool spindle 20 is exposed. In this state, spindle-related component parts such as the lock nut 59b are removed, and then the tool spindle 20 and the drawbar 31 are pulled out forwardly. Also, for refitting of the unclamping cylinder mechanism 35, the cylinder block 37 is pivoted to the original locked position about the locking bolt 46, the nut 46b is tightened, and the cylinder block 37 is tightened and fixed to the rear flange 24 by the bolts 45. Thereafter, the piping is connected to the coolant supply passage 69 and the cylinder cover 36 is mounted.

As shown above, according to this embodiment, the relay oil passage 49 is formed in the locking bolt 46, which is the leftmost one out of the eight bolts for fixing the cylinder block 37. The working oil derived from the primary hydraulic passage 52 of the tool post body 11 is supplied to the hydraulic passage 42 and the oil chamber 41 via the relay oil passage 49. Further, the cylinder block 37 is supported by the locking bolt 46 so as to be pivotable between the locked position and the release position.

Therefore, the work of removing the tool spindle 20 can be carried out while the hydraulic passages 52, 42 of the tool post body 11 and the cylinder block 37 continue to communicate with each other and while the cylinder block 37 is maintained in a supported position. As a result, the bleeding of air can be eliminated in the process of refitting the cylinder block 37 to the locked position. Further, the labor demanded on the operator can be reduced when compared with the situation of when the whole unclamping cylinder mechanism is fitted and removed as in the conventional case. Thus, the work efficiency for maintenance of this device can be greatly improved.

Further, the relay oil passage 49 is formed in the locking bolt 46 for fixing the cylinder block and the primary hydraulic passage 52 on the tool post body 11 side and the hydraulic passage 42 on the cylinder block 37 side so that these passages are communicated with each other via the relay oil passage 49. Therefore, the conventional connections with hydraulic piping become unnecessary, thereby reducing the number of parts and simplifying the structural arrangement.

According to the clamping/unclamping detection mechanism of this embodiment, the detection-target portion 31b has a tapered longitudinally sloping surface at the rear end portion of the drawbar 31. The displacement sensor 56, for outputting a voltage responsive to a change in opposing distance, is disposed opposite to the central portion 31c of the detection-target portion 31b.Therefore, it is only necessary to adjust the way the single displacement sensor 56 is mounted so as to be coincident with the central portion 31c of the detection-target portion 31b located in the unclamping position. Thus, this adjustment is simpler and the work efficiency can be improved when compared with the conventional case where two proximity sensors are mounted while the distance therebetween is adjusted.

Further, the detecting element 58 is fixedly set at a position displaced by C1 from the axis C of the cylindrical casing 57 and the casing 57 is mounted to the stopper plate 39 so that its mounting rotational angle can be adjusted. This allows the position of the detecting element 58 to be easily adjusted in the direction of axis B relative to the detection-target portion 31b by changing the mounting angle of the casing 57. Thus, this adjustment work can be achieved very easily.

According to the coolant unit 60 of this embodiment, inlets 78a, 78b, 78c are formed at the head portion 73b of the second union member 73 of the rotary union 70 with specified circumferential angular spacings so as to be directed in a direction perpendicular to the axis and further the coolant hoses 79 are connected to these inlets 78a–78c, respectively. Therefore, the height dimension h of the rotary union 70 can be made smaller when compared with the conventional structure in which the inlets are formed with spacings provided in the axial direction of the union body. Thus, the rotary union 70 as a whole can be reduced in size.

Furthermore, the cover member 71 provided for the tool post body 11 can be made smaller in an amount of protrusion in the Y-axis direction, to the extent to which the height dimension h of the rotary union 70 can be reduced. As a result, the access door 1a can be placed closer to the tool post body 11 so that the whole machine can be made more compact.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A spindle device for a machine tool, comprising:
    a tool spindle body having an axial hole therein;
    a drawbar movably disposed in the axial hole of said tool spindle body for biasing a tool in a clamping direction; and
    an unclamping cylinder mechanism provided at a rear portion of said tool spindle body for moving the drawbar in an unclamping direction, said unclamping cylinder mechanism including a cylinder block having a hydraulic passage therein, said cylinder block being connectable to a rear end wall of said tool spindle body with a plurality of bolts, a relay oil passage partially disposed in one of said plurality of bolts for allowing hydraulic fluid to communicate with said hydraulic passage in said cylinder block, and the unclamping cylinder mechanism being supportable by said one of said plurality of bolts so as to be pivotable between a locked position and a released position.

2. A spindle device as claimed in claim 1, wherein said unclamping cylinder mechanism is fixed by a locking bolt in the locked position.

3. A spindle device as defined in claim 1, wherein in the released position said unclamping mechanism is pivoted to a position that allows access to said drawbar.

4. A spindle device as defined in claim 1, wherein said one of said plurality of bolts is a locking bolt.

5. A spindle device as defined in claim 1, further comprising a spring disposed in the axial hole in said tool spindle body adjacent to said drawbar.

6. A spindle device as defined in claim 5, wherein said spring includes a plurality of belleville springs.

7. A spindle device as defined in claim 1, further comprising a clamping/unclamping detection mechanism including only one displacement sensor capable of sensing the position of said drawbar.

8. A spindle device as defined in claim 7, further comprising a casing surrounding said displacement sensor, said casing being rotationally adjustably mounted to a stopper plate.

9. A spindle device as defined in claim 8, wherein a longitudinal axis of said sensor is displaced by a predetermined amount from a longitudinal axis of said casing.

10. A spindle device as defined in claim 1, wherein said drawbar includes a boss portion and a detection-target portion.

11. A spindle device as defined in claim 10, wherein said detection-target portion having an outer diameter that is larger than an outer diameter of said boss portion.

12. A spindle device as defined in claim 11, wherein said detection-target portion having a most radially outward location.

13. A spindle device as defined in claim 12, further comprising a sensor for sensing the distance to said most radially outward location of said detection-target portion.

14. A tool post, comprising:
    a tool post body including an upper wall;
    a rotary union mounted on said upper wall of said tool post body, said rotary union having a cylindrically shaped first union member and a columnar shaped second union member, said second union member being disposed in said first union member so as to be rotatable relative thereto, said second union member having a plurality of axially extending flow passages therein and a plurality of inlets, each of said inlets being connected to a respective one of said axially extending flow passages and wherein said plurality of inlets being formed in said second union member with predetermined circumferential angular spacing and wherein said plurality of inlets each has a longitudinal axis that is disposed substantially perpendicular to a longitudinal axis of said second union member.

15. A machine tool comprising:
    a tool spindle body having an axial hole therein and an upper wall;
    a drawbar movably disposed in the axial hole of said tool spindle body for biasing a tool in a clamping direction; and
    an unclamping cylinder mechanism provided at a rear portion of said tool spindle body for moving the drawbar in an unclamping direction, said unclamping cylinder mechanism including a cylinder block having a hydraulic passage therein, said cylinder block being connectable to a rear end wall of said tool spindle body with a plurality of bolts, a relay oil passage partially disposed in one of said plurality of bolts for allowing hydraulic fluid to communicate with said hydraulic passage in said cylinder block, and the unclamping cylinder mechanism being supportable by said one of said plurality of bolts so as to be pivotable between a locked position and a released position; and
    a rotary union mounted on said upper wall of said spindle tool body, said rotary union having a cylindrically shaped first union member and a columnar shaped second union member, said second union member being disposed in said first union member so as to be rotatable relative thereto, said second union member having a plurality of axially extending flow passages therein and a plurality of inlets, each of said inlets being connected to a respective one of said axially extending flow passages.

* * * * *